Patented Dec. 24, 1946

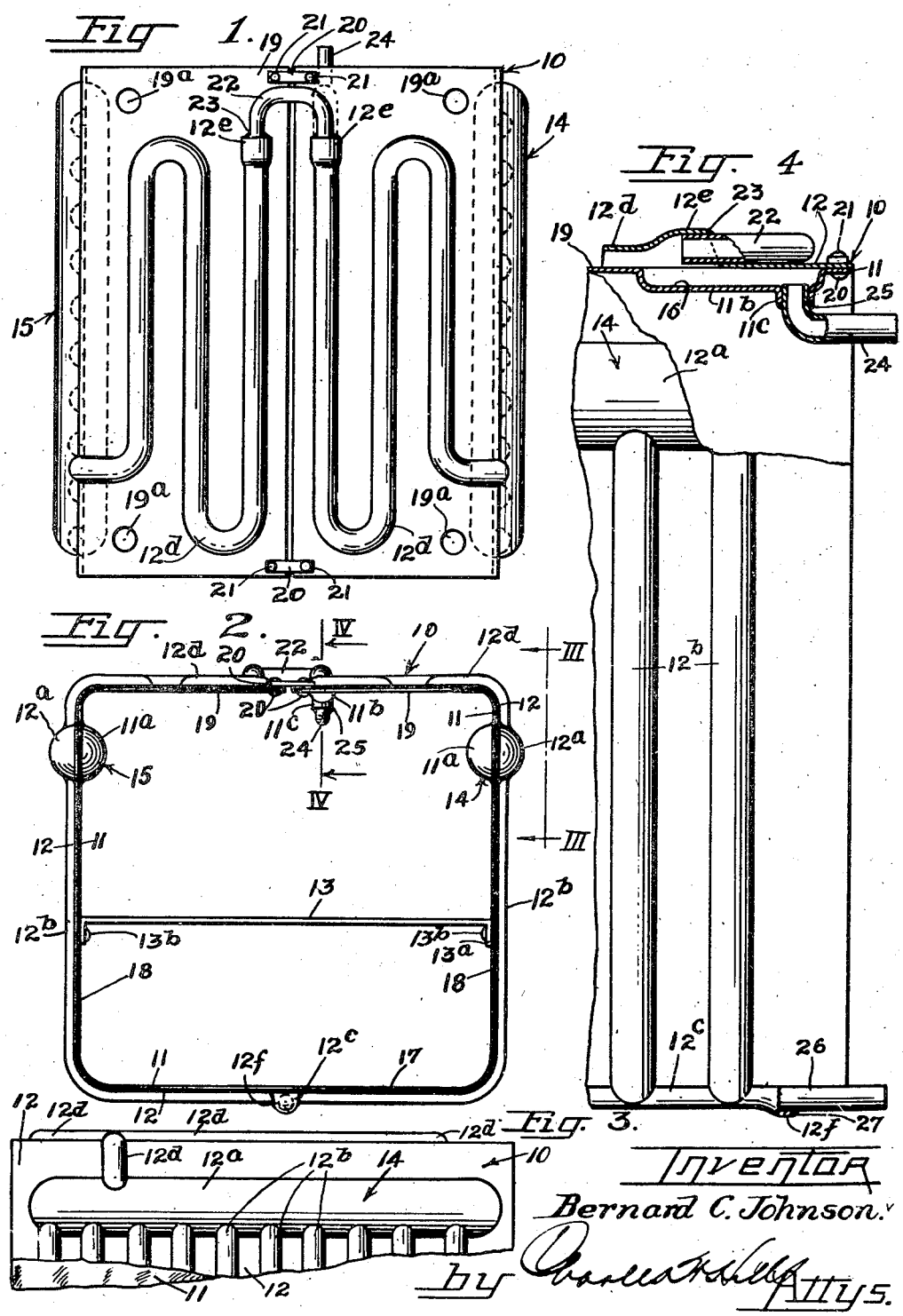

2,413,236

UNITED STATES PATENT OFFICE 2,413,236

EVAPORATOR UNIT

Bernard C. Johnson, Mundelein, Ill., assignor to Houdaille-Hershey Corporation, Detroit, Mich., a corporation of Michigan Application May 1, 1944, Serial No. 533,546

9 Claims. (Cl. 62—126)

This invention relates to heat exchangers, such as refrigerant evaporator units, fabricated from sheet metal and having embossed ducts for removal of spent fluid from the units.

Specifically the invention deals with a stamped sheet metal evaporator unit having a bottom, side walls, refrigerant ducts embossed in the bottom and side walls, headers embossed in the side walls near the tops thereof receiving the upper ends of the refrigerant ducts, flanges turned inwardly from the side walls above the headers into substantial mating relationship for forming a top wall on the unit, spent refrigerant ducts embossed in these flanges for conveying exhausted refrigerant from the tops of the headers, a short connecting tube joining the spent refrigerant ducts in each flange, and a well in at least one flange communicating with the spent refrigerant ducts therein for receiving an exhaust tube.

The evaporator units of this invention utilize metal formerly employed for providing outturned flanges on a U-shaped evaporator unit to provide inturned flanges having spent refrigerant ducts embossed therein so that only a small connecting tube need be used instead of the heretofore required cross header or exhaust tube which had to be soldered or otherwise bonded directly to the headers in the opposed legs of the unit. The invention thus eliminates the necessity for joints between the headers and an exhaust tube, provides a top wall for a refrigerant unit by only adding very little metal to a conventional U-shaped open-topped unit, and provides spent refrigerant ducts of a serpentine nature to utilize the last remaining heat-absorbing capacity of the refrigerant.

It is, then, an object of the invention to provide a sheet metal heat exchanger having a top wall formed from inturned flanges on the side walls thereof.

Another object of the invention is to provide a sheet metal heat exchanger having side walls with header chambers therein and inturned flanges thereon with ducts embossed thereon to remove material from the header chambers.

Another object of the invention is to provide a sheet metal evaporator unit having header chambers in the side walls thereof and embossed top walls formed from inturned flanges on the side walls providing spent refrigerant ducts for removing refrigerant from the tops of the header chambers.

A further object of the invention is to provide a sheet metal evaporator unit having a top wall containing a spent refrigerant duct for the extraction of the last remaining heat-absorbing capacity in the refrigerant.

A specific object of the invention is to provide a sheet metal evaporator unit having a bottom wall, upstanding side walls, inturned flanges on the side walls providing a top, header chambers embossed in the side walls, refrigerant ducts embossed in the side and bottom walls discharging into the header chambers, spent refrigerant ducts embossed in the inturned flanges for removing refrigerant from the header chambers, an inlet tube communicating with the refrigerant ducts at the bottom of the unit, and an outlet conduit communicating with the spent refrigerant ducts at the top of the unit.

Other and further objects of the invention will be apparent to those skilled in the art from the following detailed description of the annexed sheet of drawings which, by way of preferred example only, illustrates one embodiment of the invention.

On the drawing:

Figure 1 is a top plan view of an evaporator unit according to this invention.

Figure 2 is a front end elevational view of the unit of Figure 1.

Figure 3 is a fragmentary side elevational view taken along the line III—III of Figure 2.

Figure 4 is an enlarged side elevational view, with parts in vertical cross section, taken along the line IV—IV of Figure 2.

As shown on the drawing:

In Figures 1 to 4 inclusive the reference numeral 10 designates generally a sheet metal evaporator unit according to this invention composed of an inner metal sheet 11, an outer metal sheet 12, and a shelf 13. The inner metal sheet 11 is transversely embossed in spaced relation from both ends thereof as at 11a transversely across its width to provide portions of header chambers 14 and 15. The sheet 11 is further embossed as at 11b near one end thereof to provide a well 16 as will hereinafter be more fully described.

The outer sheet 12 is embossed transversely across the width thereof as at 12a to provide the outer halves of the headers 14 and 15. The sheet 12 is additionally embossed as at 12b to provide refrigerant circulating ducts. An embossment 12c is formed transversely across the outer sheet 12 at about the middle of the sheet to provide a manifold communicating with the ducts 12b. Serpentine ducts 12d are embossed in the outer sheet 12 between the ends of the sheet and the transverse embossments 12a thereof.

The sheets 11 and 12 are brazed or welded together preferably when flat and, after being joined, are bent to provide a bottom 17, opposed vertical side walls 18, 18, and opposed inturned flanges 19, 19 on the tops of the side walls. The manifold duct 12c extends under the bottom 17 in a front to rear direction, the refrigerant ducts 12b extend laterally from the manifold 12c along the bottom 17 and thence upwardly in spaced parallel relation along the side walls 18, 18 to the headers 14 and 15 respectively. These headers provide enlarged cylindrical chambers between the embossments 11a and 12a of the sheet communicating with the upper ends of all of the refrigerant ducts 12b to receive refrigerant therefrom. The serpentine ducts 12d extend from the tops of each header 14 and 15 preferably near the front end of the unit as shown and overlie the flanges 19, 19 to provide an elongated path in each flange having a plurality of legs extending in a front to rear direction.

The shelf 13 has downturned flanges 13a at the sides thereof secured to the side walls 18, 18 of the unit as by rivets 13b or the like. The shelf 13 is in spaced relation above the bottom 17 and beneath the flanges 19, 19.

The inner ends of the flanges 19, 19 are in closely spaced parallel relationship and brackets 20, 20 secured to the flanges by means of rivets 21 connect the flanges in aligned relationship to provide a top wall for the unit 10.

The ends of the serpentine ducts 12d are at the rear end of the unit adjacent the edges of the flanges and have enlarged mouths 12e thereon receiving the ends of a U-shaped connecting tube 22 therein. The connecting tube 22 is secured in these mouths 12e by soldered, brazed, or welded bonds 23.

The well 16 provided by the embossed portion 11b on the inner sheet 11 is in one of the flanges 19 adjacent the rear end of the unit as best shown in Figures 1 and 4. This embossment 11b is provided with a depending nipple 11c thereon as best shown in Figures 2 and 4 providing a receptacle for the end of a tube 24. The tube 24 is secured to portion 11c by means of a soldered, brazed, or welded bond 25. As shown in Figure 4, the well 16 communicates with the end of the duct 12d to receive refrigerant from the duct and from the connecting tube 22. The refrigerant then drains from the well 16 through the tube 24.

As also shown in Figure 4, the manifold 12c has an enlarged mouth 12f at the rear end thereof receiving a supply tube 26. The tube 26 is secured to the mouth 12f by means of a soldered, brazed, or welded bond 27.

Refrigerant introduced through the feed tube 26 is distributed by the manifold 12c to all of the ducts 12b. These ducts 12b extend from the manifold 12c around the bottom 17 and sides 18, 18 of the unit to circulate refrigerant around a sharp freezing chamber enclosed by the unit and absorb heat from this chamber. The upper ends of each circulating duct 12b communicate with the bottoms of the headers 14 and 15 in the upper ends of the side walls of the unit. These header chambers 14 and 15 collect gaseous refrigerant from the distributing ducts and spent refrigerant flows from the header chambers through the serpentine ducts 12d in the flanges 19, 19. The ducts 12d act as secondary headers for the collection of spent refrigerant from the main headers and serve to completely dry the spent refrigerant vapor before it reaches the outlet tube 24. The secondary headers provided by the ducts 12d, 12d are in heat exchange relationship with the chamber enclosed by the unit being a part of the top wall of the unit.

As best shown in Figure 1, the flanges 19, 19 of the unit 10 have mounting holes 19a therein adapted to receive mounting studs for suspending the unit from the top wall of a refrigerator cabinet.

From the above descriptions it will be understood that the invention provides a sheet metal evaporator unit having header chambers in the side walls thereof and equipped with opposed inturned flanges above the header chambers cooperating to define a top wall for the unit and being embossed to provide a serpentine duct acting as secondary headers and driers for the spent refrigerant from the main headers. These inturned flanges eliminate the necessity for the heretofore required cross headers or manifolds since a small U-tube can be used to join the ducts in each flange.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A heat exchanger comprising a U-shaped member having headers in the upper ends of the legs thereof, ducts extending around the legs and bottom thereof communicating with said headers, inturned flanges on the tops of the legs above said headers, and ducts in said flanges communicating with the tops of said headers.

2. A heat exchanger comprising a unit having a bottom, side walls, and a split top wall, headers in said side walls, ducts in said bottom and side walls communicating with the headers, ducts in said split top wall communicating with the tops of said headers, and means interconnecting the ends of the ducts in said split top wall.

3. A heat exchanger comprising a pair of secured-together contiguous metal sheets defining the side walls, bottom and top of a chamber, said sheets being embossed to define refrigerant circulating ducts in the bottom and side walls, to define a header chamber in each side wall near the top thereof communicating with said ducts, and to define spent refrigerant ducts directly communicating with the tops of the header chambers and extending along the top of the unit, and a U-shaped tube connecting said spent refrigerant ducts.

4. An evaporator unit comprising a pair of contiguous secured-together metal sheets bent to define the bottom, side walls and top of a sharp freezing chamber, said sheets having the ends thereof closely adjacent each other in the top of the unit to form a substantially continuous and flat top wall, embossments in said sheets forming header chambers in each side wall thereof, refrigerant circulating ducts around the bottom and side walls communicating at their upper ends with the header chambers and an inlet manifold communicating with the bottom portion of the circulating ducts, said outer sheet having embossments therein extending from the tops of the headers over the top of the unit and terminating adjacent the ends of the unit, a U-shaped tube bridging the ends of the unit connecting the ends of said ducts, and a spent refrigerant tube communicating with the connected ducts.

5. A sheet metal evaporator unit having a bottom wall, upstanding side walls, and inturned flanges extending from the upper ends of said side walls into closely spaced aligned relationship for forming a substantially horizontal top wall on the unit, said sheet metal being embossed to define refrigerant circulating ducts in the bottom and side walls and to define header chambers in each side wall and secondary header ducts in each inturned flange communicating with the tops of the header chambers and terminating adjacent the aligned ends of the flanges, a U-tube connecting the ends of said ducts, and a spent refrigerant tube communicating with the connected ducts for removing refrigerant therefrom.

6. A sheet metal evaporator unit having opposed side walls with header chambers therein, refrigerant circulating ducts in said side walls communicating with said header chambers, inturned flanges on said upper ends of said side walls, means connecting the ends of said inturned flanges in closely spaced aligned relationship to provide a substantially continuous top for the unit, and embossments on said flanges providing serpentine spent refrigerant ducts communicating with the tops of the headers for drying refrigerant exhausted from the headers to extract the last remaining heat-absorbing capacity therefrom.

7. In a sheet metal evaporator unit having header chambers in the side walls thereof and U-shaped refrigerant circulating ducts communicating at their upper ends with the bottoms of said header chambers, the improvements of opposed inturned flanges on said side walls having closely spaced ends forming a top for the unit, and embossments in said flanges providing spent refrigerant passageways communicating with the tops of the headers.

8. A sheet metal evaporator unit comprising a pair of secured-together contiguous metal sheets bent to form the bottom and side walls of an evaporator unit and having inturned flanges on the upper ends of the side walls terminating in aligned spaced opposed relationship to form a top for the unit, said outer sheet having embossments therein defining a header chamber at the upper end of each side wall together with U-shaped refrigerant circulating ducts extending around the bottom and side walls and terminating at their upper ends in said header chambers and an inlet manifold communicating with the bottoms of the ducts, said outer sheet being further embossed to provide serpentine ducts in said inturned flanges communicating with the upper ends of the headers and terminating adjacent the ends of the sheet near the rear end of the unit, a U-tube connecting the spaced ends of said ducts on the flanges, said inner sheet having an embossment thereon defining a well communicating with the duct on one of said flanges and having a dependent collar thereon, and a spent refrigerant tube secured in said collar.

9. In a sheet metal evaporator unit of the type having opposed upstanding side walls with header chambers therein and a bottom wall, lubricant conveying ducts formed in said bottom and side walls and communicating with said header chambers, the improvements of inturned flanges on the upper ends of said side walls terminating in closely spaced aligned relationship to form a top for the unit, brackets attached to the inner ends of said flanges to hold the same in aligned relationship, embossments on each of said flanges forming serpentine ducts communicating with the upper ends of the header chambers and terminating in closely spaced relationship at the rear end of the top of the unit, a U-tube connecting said closely spaced ends of the ducts, a well-defining portion formed in one of said flanges beneath the end of the duct in the flange communicating with said duct and said U-tube to receive refrigerant therefrom, and a spent refrigerant tube secured to said well-defining portion.

BERNARD C. JOHNSON.